(12) United States Patent
Francos et al.

(10) Patent No.: US 12,512,619 B2
(45) Date of Patent: Dec. 30, 2025

(54) HINGELESS PEEL BACK AUTOMOTIVE CONNECTOR COVER

(71) Applicant: ABB Schweiz AG, Baden (CH)

(72) Inventors: Angel Jose Francos, Birmingham (GB); Meirion Buck, Swadlincote (GB)

(73) Assignee: ABB Schweiz AG, Baden (CH)

( * ) Notice: Subject to any disclaimer, the term of this patent is extended or adjusted under 35 U.S.C. 154(b) by 288 days.

(21) Appl. No.: 17/568,990

(22) Filed: Jan. 5, 2022

(65) Prior Publication Data

US 2022/0224039 A1 Jul. 14, 2022

(30) Foreign Application Priority Data

Jan. 8, 2021 (EP) ..................... 21150779

(51) Int. Cl.
*B60R 16/02* (2006.01)
*H01R 13/447* (2006.01)

(52) U.S. Cl.
CPC ....... *H01R 13/447* (2013.01); *B60R 16/0215* (2013.01)

(58) Field of Classification Search
CPC .......................... H01R 13/447; B60R 16/0215
See application file for complete search history.

(56) References Cited

U.S. PATENT DOCUMENTS

| | | | | |
|---|---|---|---|---|
| 6,576,838 B2* | 6/2003 | Matsumura | .......... | H01H 85/044 |
| | | | | 439/522 |
| 7,241,183 B2* | 7/2007 | Wasalaski | ............ | H01R 13/506 |
| | | | | 439/902 |
| 8,747,129 B2* | 6/2014 | Ichio | ....................... | B60L 53/16 |
| | | | | 439/135 |
| 9,246,268 B1 | 1/2016 | Richardson et al. | | |
| 2004/0192099 A1 | 9/2004 | Seminara et al. | | |
| 2007/0232140 A1 | 10/2007 | Tyler | | |
| 2011/0111610 A1 | 5/2011 | Kim et al. | | |
| 2017/0141506 A1 | 5/2017 | Richardson et al. | | |
| 2018/0212360 A1 | 7/2018 | Motohashi | | |

FOREIGN PATENT DOCUMENTS

| | | |
|---|---|---|
| CN | 1409445 A | 4/2003 |
| CN | 101632204 A | 1/2010 |
| CN | 101682141 A | 3/2010 |
| CN | 102403683 A | 4/2012 |
| CN | 102420368 A | 4/2012 |
| CN | 104114401 A | 10/2014 |
| CN | 106104936 A | 11/2016 |
| CN | 108429022 A | 8/2018 |

(Continued)

OTHER PUBLICATIONS

The Patent Office of the People's Republic of China, Office Action in Chinese Patent Application No. 202210014841.2, 9 pp. (Sep. 12, 2023).

(Continued)

*Primary Examiner* — Vanessa Girardi
(74) *Attorney, Agent, or Firm* — Leydig, Voit & Mayer, Ltd.

(57) ABSTRACT

A system and method include a protection cover configured to cover an automotive connector and to protect a fastening latch mechanism of the automotive connector from paint, particles, humidity and/or liquids.

10 Claims, 3 Drawing Sheets

(56) References Cited

FOREIGN PATENT DOCUMENTS

| | | |
|---|---|---|
| CN | 209766680 U | 12/2019 |
| CN | 111106473 A | 5/2020 |
| FI | 934844 | 11/1993 |
| JP | 10-284162 A | 10/1998 |
| JP | 2008-91117 A | 4/2008 |
| KR | 2003-0076750 A | 9/2003 |
| KR | 10-2005-0115134 A | 12/2005 |
| WO | WO 2008/100864 A1 | 8/2008 |

OTHER PUBLICATIONS

Intellectual Property India, Examination Report in Indian Patent Application No. 202144061554, 7 pp. (Jul. 28, 2022).
European Patent Office, Extended European Search Report in European Patent Application No. 21150779.3, 10 pp. (Jun. 7, 2021).

* cited by examiner

HINGELESS PEEL BACK AUTOMOTIVE CONNECTOR COVER

CROSS-REFERENCE TO RELATED APPLICATIONS

This patent application claims priority to European Patent Application Ser. No. EP21150779, filed on Jan. 8, 2021, which is incorporated herein in its entirety by reference.

FIELD OF THE DISCLOSURE

The present disclosure relates to a protection cover for an automotive connector and, more specifically, to an automotive connector, a vehicle comprising an automotive connector, and a use of the protection cover.

BACKGROUND OF THE DISCLOSURE

Automotive connectors found in automotive harnesses can be exposed to moisture, dirt, impact, and/or can undergo a paint procedure in which the harness and the conduit system is painted. Therefore, particles, liquids, dirt, or paint may ingress into the connector fastening latch mechanism. In case of paint, the paint then freezes the connector fastening latch mechanism such that the latch cannot be engaged or disengaged.

In the case of particles or liquids, these can damage the fastening latch mechanism, such that it will not be able to achieve the intended function. In the case of impact, this can damage the functioning of the mechanism.

BRIEF SUMMARY OF THE DISCLOSURE

In one aspect, the present disclosure describes an arrangement in which the locking mechanism of the connector continues to function when being exposed and after having been exposed to liquids, moisture, dirt or paint, or impact by foreign bodies.

The problem is solved by the subject-matter of the independent claims. Embodiments are provided by the dependent claims, the following description and the accompanying figures.

The described embodiments similarly pertain to the protection cover, the automotive connector, the vehicle comprising an automotive connector, and the use of a protection cover.

Technical terms are used by their common sense. If a specific meaning is conveyed to certain terms, definitions of terms will be given in the following in the context of which the terms are used.

According to a first aspect, a protection cover is provided that is configured to cover an automotive connector and to protect a fastening latch mechanism of the automotive connector from paint, particles, humidity, liquids and/or impact and vibration.

The protection cover is designed and structured such that it covers only a part of the connector. The covered part may be regarded as a "top" part of the connector that at least comprises the fastening latch mechanism. The fastening latch mechanism is configured to releasably fasten the automotive connector to a counter-connector, for example, a pin-side connector to a socket-side connector, such that a secure and fixed mechanical connection is provided and therefore also a secure electrical connection. The protection cover is designed such that it is able to attach to a variety of automotive connectors, protecting the automotive connector fastening latch mechanism from several types of harmful external influences. E.g., a paint ingress may occur in cases where the automotive harnesses undergo a paint procedure in which the harness and the conduit system is painted. By impeding the paint ingresses into the connector fastening latch mechanism, the paint cannot freeze the connector fastening latch mechanism and therefore ensures that the latch can be engaged or disengaged. E.g., when painting, the connector may be covered completely with paint; however, access to the latch mechanism may be needed for disconnecting the cable during service and maintenance, without removing the cover. The cover remaining on place then offers continuous protection against moisture and dirt ingress and protects against impact damage to the latch mechanism by using a dampening material. Further, the cover protects the connector in service from ingress of dirt and liquid and impact of foreign bodies.

According to an embodiment, the protection cover comprises a push fit mechanism. The push fit mechanism allows installing the protection cover subsequently, in other words, the protection cover need not be integrated in the manufacturing procedure of the connector and can be applied to available, completely manufactured connectors subsequent to manufacture, assembly, and/or installation of the connectors to a vehicle.

According to an embodiment, the push fit mechanism comprises two legs, each comprising a hook-like form at their feet. The hooks may be oriented in opposite directions or in opposed relation to one another. The two legs extrude from a common body that is part of the protection cover.

According to an embodiment, the push fit mechanism is configured to snap into an opening covered partly by a protrusion of the automotive connector such that the protection cover can be mounted on the connector.

According to an embodiment, the push fit mechanism is a universal push fit mechanism fitting to a plurality of different connectors. That is, the universal push fit mechanism exploits common characteristics of latch fastening mechanisms of several types of automotive connectors. Thus, a single universal cover for connector can be used to protect the complete ranges of several types of automotive connectors.

According to an embodiment, the push fit mechanism is configured to be moved into an opening covered partly by a protrusion of the automotive connector, wherein the protrusion fixes the feet and hence the protection cover such that the protection cover can be mounted in this alternative way on the connector. The push fit mechanism may be designed such that both ways of fixing, i.e., snapping and moving or sliding, are possible.

According to an embodiment, the legs have a common body that is limited by a free space around the body. The free space ensures flexibility and alleviates the removal of the protection cover if wanted.

According to an embodiment, the protection cover has a front portion and a rear portion, the front portion being the part, which is connected to a counterpart of the connector, and covering the fastening latch mechanism, wherein the front portion is foldable.

In other words, one part, i.e., the front part or portion of the protection cover is designed such that it is, either permanently or removably, fixed on the connector. This part holds the protection cover in place. The other part, i.e., the rear part or portion, is foldable by hand such that it can be lifted to release the surface of the fastening latch mechanism such that this mechanism can be accessed, and the connector can be connected to or disconnected from its counterpart.

When no access to the fastening latch mechanism is needed, the lifted portion can be folded down and put on the fastening latch mechanism again. That is, the protection cover is flexible enough to fold the front of the structure to engage or disengage the connector fastening latch mechanism while maintaining protection to the connector, e.g., by providing a paint barrier.

According to an embodiment, the protection cover has a shape that fits to the shape of the automotive connector. That is, the protection cover has a shape that not only covers the connector portion to be covered as, e.g., a simple box, but is adapted to the contours of the automotive connector.

According to an embodiment, the protection cover has a shape that fits to a plurality of different automotive connectors. In other words, the protection cover is universally applicable. This may be achieved, e.g., by covering a part of the connector that is common to further connectors, or by a shape that fits at least in the outer border also to further connectors.

According to an embodiment, the protection cover is made of rubber or rubber-like material. The rubber or rubber-like material ensures the flexibility of the cover, especially to enable the mounting and removing of the cover and the foldability. It further provides a good fitting and a good long-term stability such that a high number of folding activities is possible. The construction material also serves as an impact damper that is configured to protect the cover from impact and vibrations. Further, no mechanically movable parts such as screws, hinges, etc. are necessary for mounting the protection cover or for the folding of the front portion.

According to a further aspect, an automotive connector is provided comprising a protection cover as described in this disclosure.

According to a further aspect, a vehicle is provided comprising such an automotive connector.

According to a further aspect, a use of a protection cover for protecting an automotive connector from paint, particles, humidity and/or liquids is provided, as well as impact and vibration protection.

These and other features, aspects and advantages of the present disclosure will become better understood with reference to the accompanying figures and the following description. Identical or equivalent elements are, in principle, provided with the same reference numerals or signs for brevity and simplicity and should not be construed as limiting in any way of the concepts illustrated.

DETAILED DESCRIPTION OF A PREFERRED EMBODIMENT

Figure 1:
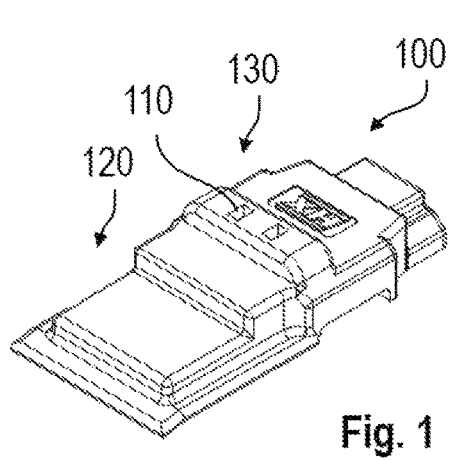
FIG. 1 shows a 3-D diagram of a protection cover in accordance with the disclosure.

FIG. 1 shows a three-dimensional diagram with a top-side-view of a protection cover 100 in accordance with the disclosure. The protection cover 100 may be made of rubber or a rubber-like material. The protection cover 100 comprises a front portion 120 and a rear portion 130. The front portion 120 is designed to cover the fastening latch mechanism 220 of the automotive connector 200 shown in FIG. 2. The front portion 120 is flexible such that it can be folded by hand. The rear portion 130 comprises the push fit mechanism 500 as described relative to FIG. 5. The protection cover 100 further comprises openings 110 that are also described as "free space" 110 in this disclosure.

Figure 2:
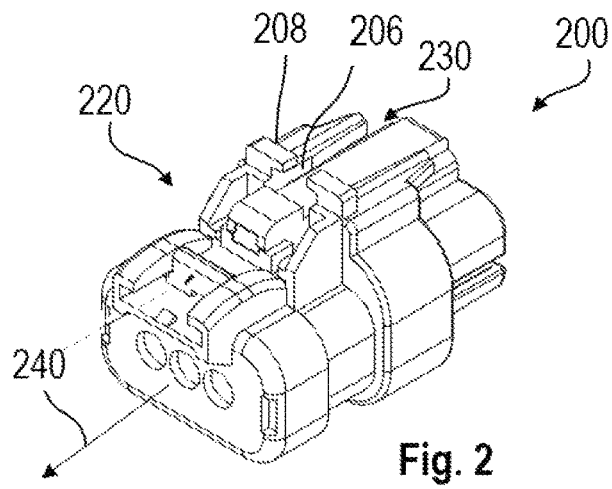
FIG. 2 shows a 3-D diagram of an automotive connector in accordance with the disclosure.

FIG. 2 shows a 3-D diagram with a top-side-view of an automotive connector 200, which may be covered by protection cover 100. Automotive connector 200 comprises a portion with the fastening latch mechanism 220 and a portion 230 comprising an opening 206 and protrusions 208, in which the push fit mechanism 500 may be moved from a front or rear direction or may be pushed through from the top, wherein the front direction is indicated by arrow 240.

Figure 3:
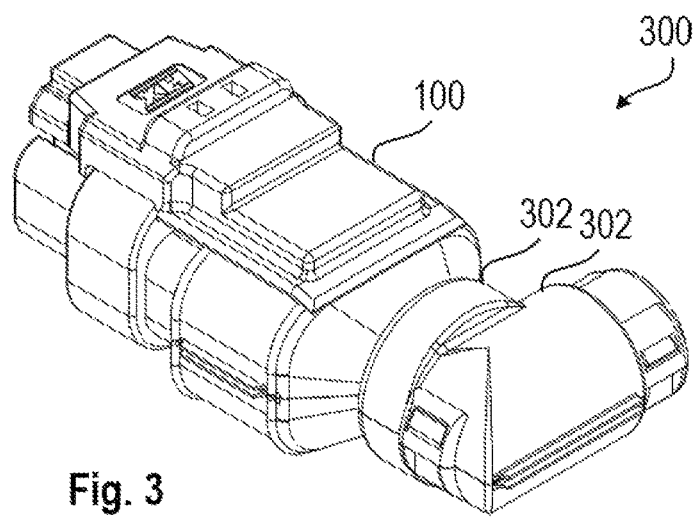
FIG. 3 shows a 3-D diagram of the automotive connector in conjunction with a conduit connector fitting in accordance with the disclosure.
Figure 3A:
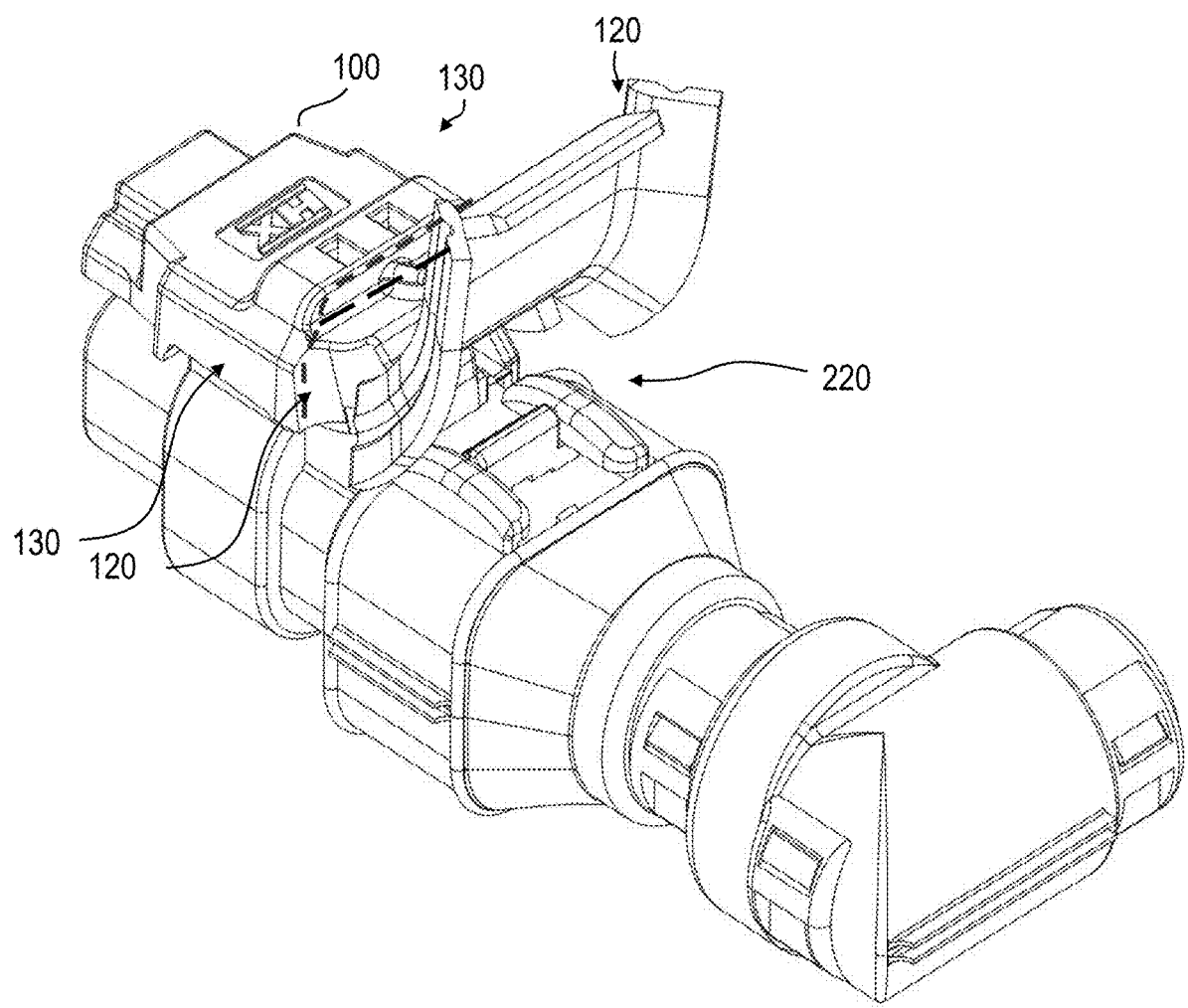
FIG. 3A shows a 3-D diagram of the automotive connection in conjunction with a conduit connector fitting in accordance with the disclosure.

FIG. 3 shows a 3-D diagram with a top-side-view of an automotive connector 200 in conjunction with a conduit connector fitting 302 as an ensemble 300, and the protection cover 100 mounted on the automotive connector 200. The conduit fitting can be attached to the back of the connector to protect the cable coming out of the connector. The connector is also designed to be connected to a further connector when needed. When mounted and no access is necessary, the protection cover 100 covers the top of the automotive connector as shown in FIG. 3, such that it protects the automotive connector fastening latch mechanism from paint ingress, liquid, moisture, dirt, or other particles. FIG. 3A shows protection cover 100 with front portion 120 being foldable and folded such that it is lifted to release the surface of the fastening latch mechanism 220.

Figure 4:
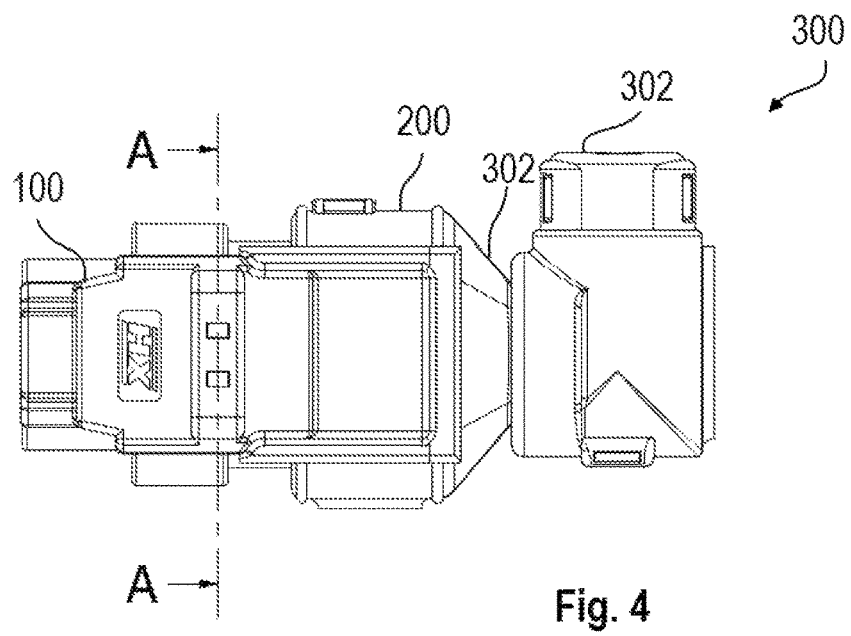
FIG. 4 shows a diagram of a top view of the automotive connector in conjunction with a conduit connector fitting shown in FIG. 3.

FIG. 4 shows a diagram of a top view of automotive connector 200 in conjunction with a conduit connector fitting shown in FIG. 3, where the protection cover 100 is mounted on the automotive connector 200. The arrangement is the same as shown in FIG. 3. FIG. 4 shows further the cutting line A-A for the sectional view of FIG. 5.

Figure 5:
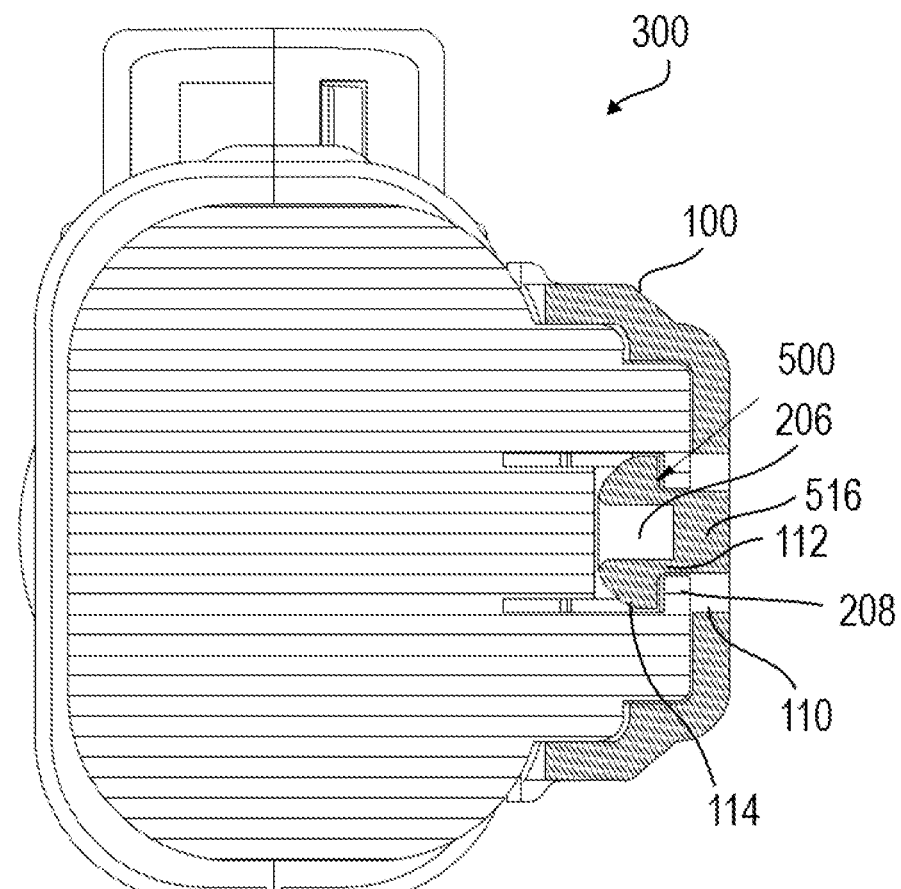
FIG. 5 shows a diagram of a sectional view of the mounted protection cover in accordance with the disclosure.

FIG. 5 shows a diagram of a sectional view of the mounted protection cover 100. The shape of the protection cover 100 is fitted to the shape of the automotive connector 200, through which the cut A-A of the sectional view is made. FIG. 5 shows the push fit mechanism 500 that comprises two legs 112, each comprising a hook-like form at their feet 114. The push fit mechanism 500 is configured to snap into the opening 206 covered partly by a protrusion 208 of the automotive connector 200. FIG. 5 shows further openings 110 or free space by which the common body 516 of the legs 112 is limited to provide flexibility, and which may further alleviate the removal of the protection cover 100.

Figure 6:
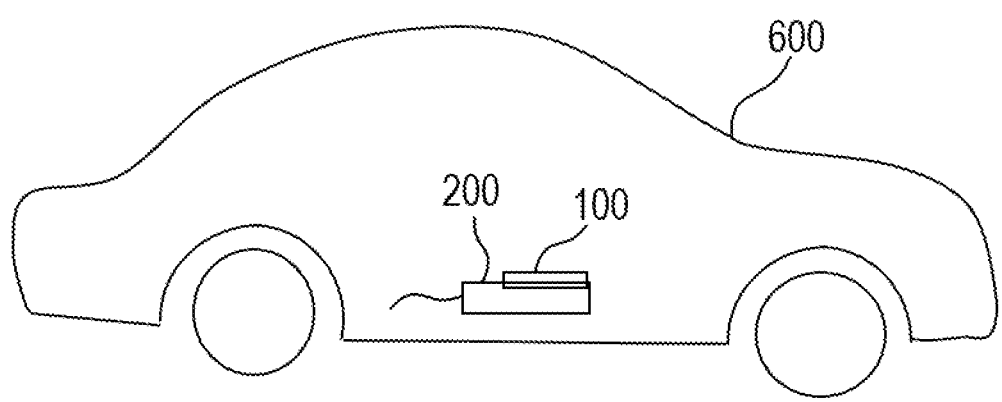
FIG. 6 shows a diagram of a vehicle with an automotive connector in accordance with the disclosure.

FIG. 6 shows a diagram of a vehicle 600 with an automotive connector 200 as described in this disclosure.

Other variations to the disclosed embodiments can be understood and effected by those skilled in the art in practicing the claimed invention, from the study of the drawings, the disclosure, and the appended claims. In the claims, the word "comprising" does not exclude other elements or steps and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the claims.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A protection cover configured to cover an automotive connector and to protect a fastening latch mechanism of the automotive connector from paint, particles, humidity, liquids and/or impact and vibration, wherein the protection cover is made of rubber or rubber-like material, wherein the protection cover has a front portion and a rear portion, the front portion being connected to a conduit connector fitting of the automotive connector and covering the fastening latch mechanism, and wherein the front portion is elastically deformable and peeled back via a hingeless construction to release a surface of the fastening latch mechanism such that the fastening latch mechanism is accessible.

2. The protection cover according to claim 1, wherein the protection cover has a shape that fits to a shape of the automotive connector.

3. The protection cover according to claim 1, wherein the protection cover comprises a push fit mechanism.

4. The protection cover according to claim 3, wherein the push fit mechanism comprises two legs, each of the two legs comprising a foot, wherein each of the two legs comprises a hook-like form at its respective foot.

5. The protection cover according to claim 4, wherein the two legs are connected to a common body, the common body being limited by a free space around the common body.

6. The protection cover according to claim 4, wherein a protrusion and an opening are formed in the automotive connector, and wherein the push fit mechanism is configured to snap into the opening, the opening being covered partly by the protrusion of the automotive connector.

7. The protection cover according to claim 6, wherein the push fit mechanism is configured to be moved into the opening covered partly by the protrusion of the automotive connector, and wherein the protrusion fixes the respective foot of each of the two legs.

8. An automotive connector, comprising:
   a body,
   a fastening latch mechanism formed on the body, and
   a protection cover configured to at least partially cover the body and to protect the fastening latch mechanism from paint, particles, humidity, liquids and/or impact and vibration, wherein the protection cover is made of rubber or rubber-like material, wherein the protection cover has a front portion and a rear portion, the front portion being connected to a conduit connector fitting of the automotive connector and covering the fastening latch mechanism, and wherein the front portion is elastically deformable and peeled back via a hingeless construction to release a surface of the fastening latch mechanism such that the fastening latch mechanism is accessible.

9. A vehicle comprising an automotive connector, the automotive connector comprising:
   a body,
   a fastening latch mechanism formed on the body, and
   a protection cover configured to at least partially cover the body and to protect the fastening latch mechanism from paint, particles, humidity, liquids and/or impact and vibration, wherein the protection cover is made of rubber or rubber-like material, wherein the protection cover has a front portion and a rear portion, the front portion being connected to a conduit connector fitting of the automotive connector and covering the fastening latch mechanism, and wherein the front portion is elastically deformable and peeled back via a hingeless construction to release a surface of the fastening latch mechanism such that the fastening latch mechanism is accessible.

10. A method for protecting a latching mechanism of an automotive connector from paint, particles, humidity, liquids and/or impact and vibration protection, comprising:
   providing the automotive connector having a body,
   providing a fastening latch mechanism formed on the body, and
   attaching a protection cover to the body, the protection body configured to cover at least a portion of the body and to protect the fastening latch mechanism from paint, particles, humidity, liquids and/or impact and vibration, wherein the protection cover is made of rubber or rubber-like material, wherein the protection cover has a front portion and a rear portion, the front portion being connected to a conduit connector fitting of the automotive connector and covering the fastening latch mechanism, and wherein the front portion is elastically deformable and peeled back via a hingeless construction to release a surface of the fastening latch mechanism such that the fastening latch mechanism is accessible.

\* \* \* \* \*